US005499365A

United States Patent [19]
Anderson et al.

[11] Patent Number: 5,499,365
[45] Date of Patent: Mar. 12, 1996

[54] SYSTEM AND METHOD FOR CONTROLLING VERSIONS OF OBJECTS IN AN OBJECT ORIENTED COMPUTING ENVIRONMENT

[75] Inventors: James B. Anderson; Francis L. Fitzpatrick, both of Austin, Tex.; William M. Hans, New City, N.Y.; Charles B. Harvey, Jr., Golden, Colo.; Herman Mitchell, Lithonia, Ga.; James R. Wason, Tuxedo, N.Y.

[73] Assignee: International Business Machines Corporation, Armonk, N.Y.

[21] Appl. No.: 101,618

[22] Filed: Aug. 4, 1993

[51] Int. Cl.$^6$ ............................ G06F 17/30; G06F 17/50
[52] U.S. Cl. ..................... 395/600; 395/700; 395/650; 364/474.24; 364/282.1; 364/917.96; 364/974; 364/974.7; 364/DIG. 2
[58] Field of Search ............................... 395/600, 700, 395/650, 164; 364/474.24

[56] References Cited

U.S. PATENT DOCUMENTS

| 4,853,843 | 8/1989 | Ecklund | 364/DIG. 1 |
|---|---|---|---|
| 5,019,963 | 5/1991 | Alderson et al. | 364/DIG. 1 |
| 5,043,871 | 8/1991 | Nishigaki et al. | 364/DIG. 1 |
| 5,047,918 | 9/1991 | Schwartz et al. | 364/DIG. 1 |
| 5,129,082 | 7/1992 | Tirfing et al. | 395/600 |
| 5,367,633 | 11/1994 | Matheny et al. | 395/164 |
| 5,437,027 | 7/1995 | Bannon et al. | 395/600 |

OTHER PUBLICATIONS

Beech et al., "Generalized Version Control in an Object–Oriented Database", *Proceedings Fourth International Conference on Data Engineering*, 1–5 Feb. 1988, Los Angeles, Calif., pp. 14–22.

Fishman, D. H., "An Overview of the IRIS Object–Oriented DBMS", *COMPCOM Spring 88*.

*Thirty–Third IEEE Computer Society International Conference*, 29 Feb.–3 Mar., San Francisco, Calif., pp. 177–180.

Chou et al., "Versions and Change Notification in an Object–Oriented database System", *25th ACM/IEEE Design Automation Conference*, 12–15 Jun., Anaheim, Calif. pp. 275–281.

*Generic Computer Aided Software Engineering (CASE) Databases Requirements*, D. Hsich, IEEE 1989, pp. 422–423.

Primary Examiner—Thomas G. Black
Assistant Examiner—Paul R. Lintz
Attorney, Agent, or Firm—Bell, Seltzer, Park & Gibson

[57] ABSTRACT

A system and method for controlling versions of selected objects in an object oriented computing system includes a common logical key attribute in each version of an object, which is used to identify all versions of an object. The object frame of each version also includes a unique combination of an insert sequence attribute and an extract sequence attribute. The unique combination of insert sequence attribute and extract sequence attribute allows the selection of a unique version of an object based on time. In order to select one or more versions of an identified object, a version time is converted into a selection sequence value. The selection sequence value is then compared to the insert sequence attributes and extract sequence attributes in order to select at least one of the versions of the selected objects. Each version may also include a perspective attribute for providing another selection criteria for selecting one or more versions of an object.

28 Claims, 8 Drawing Sheets

SYSTEM AND METHOD FOR CONTROLLING VERSIONS OF OBJECTS IN AN OBJECT ORIENTED COMPUTING ENVIRONMENT

FIELD OF THE INVENTION

This invention relates to data processing systems and methods and more particularly to object oriented computing environments.

BACKGROUND OF THE INVENTION

Object oriented programming systems and processes, also referred to as "object oriented computing environments", have been the subject of much investigation and interest in state of the art data processing environments. As is well known to those having skill in the art, object oriented programming systems are composed of a large number of "objects". An object is a data structure, also referred to as a "frame", and a set of operations or functions, also referred to as "methods", that can access that data structure. The frame has many "slots", each of which contains an "attribute" of the data in the slot. The attribute may be a primitive (such as an integer or string) or an object reference which is a pointer to another object. Objects having identical data structures and common behavior can be grouped together into, and collectively identified as, a "class".

Each defined class of objects will usually be manifested in a number of "instances". Each instance contains the particular data structure for a particular example of the object. In an object oriented computing environment, the data is processed by requesting an object to perform one of its methods by sending the object a "message". The receiving object responds to the message by choosing the method that implements the message name, executing this method on the named instance, and returning control to the calling high level routine along with the results of the method. The relationships between classes, objects and instances are established during "build time" or generation of the object oriented computing environment, i.e. prior to "run time" or execution of the object oriented computing environment.

In addition to the relationships between classes, objects and instances identified above, inheritance relationships also exist between two or more classes such that a first class may be considered a "parent" of a second class and the second class may be considered a "child" of the first class. In other words, the first class is an ancestor of the second class and the second class is a descendant of the first class, such that the second class (i.e., the descendant) is said to inherit from the first class (i.e. the ancestor). The data structure of the child class includes all of the attributes of the parent class.

Object oriented systems have heretofore recognized "versions" of objects. A version of an object is the same data as the object at a different point in time. For example, an object which relates to a "work in progress", is a separate version of the same object data which relates to a completed and approved work. Many applications also require historical records of data as it existed at various points in time. Thus, different versions of an object are required.

Heretofore, versions of an object were treated as totally independent objects. Complicated processing was required to implement a version control mechanism. Other applications have recognized versions of objects and have used customized logic to implement version control. In this case, the version control system of one application was not usable with other applications, so that application portability was reduced.

SUMMARY OF THE INVENTION

It is therefore an object of the present invention to provide systems and methods for controlling versions of objects in an object oriented computing environment.

It is another object of the invention to provide systems and methods for generically controlling versions of objects in an object oriented computing environment to thereby reduce the amount of customized logic which must be generated for version control.

These and other objects are provided, according to the present invention, by a system and method for controlling versions of selected objects in an object oriented computing system on a computing platform, wherein each object includes an object frame containing data attributes and at least one object method for performing actions on the associated objects. The version control system creates a plurality of versions of a selected object. The object frame of each version includes unique data attributes and a common logical key attribute which is used to identify all versions of an object. The object frame of each version also includes a unique combination of an insert sequence attribute and an extract sequence attribute. The unique combination of insert sequence attribute and extract sequence attribute allows selection of a unique version of an object based on time.

According to the invention, the plurality of versions of the object are identified based on the common logical key attribute associated therewith. In order to select one or more versions of the identified object, a version identifier, such as a version time, is converted into a selection sequence value. Each application which uses the version controlled objects may include its own logic for converting a version identifier such as time into a selection sequence value, based on the unique requirements of that application.

The selection sequence value is then compared to the insert sequence attributes and extract sequence attributes of the versions of the selected object in order to select at least one of the versions of the selected object. The comparison may find an applicable version having an insert sequence attribute which is less than or equal to the selection sequence value and an extract sequence attribute which is greater than the selection sequence value. This selection method finds one applicable version valid at a particular time. Alternatively, all versions which were inserted by a certain time can be found by finding those versions having an insert sequence attribute which is equal to the selection sequence value. As another alternative, all versions which were extracted by a particular time can be found by identifying those versions having an extract sequence attribute which is equal to the selection sequence value.

According to another aspect of the invention, the object frame of each version also includes a perspective attribute for providing another selection criteria for selecting one or more versions of an object. When identifying versions, a perspective value can be compared to the perspective attributes of all of the versions, and only those versions which have a perspective attribute equal to the perspective value can be selected. This comparison can be made in addition to the comparison by insert sequence attribute and extract sequence! attribute.

The invention also supports updates to version controlled objects. Thus, new versions can be added, existing versions can be changed, existing versions can be deleted, and previous actions can be undone. Accordingly, versions of objects are generically generated, identified and processed in an object oriented computing environment.

DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Prior to describing a system for controlling versions of objects in an object orienting computing environment, a general overview of object oriented computing environments will be provided. An overview of a system and method for controlling versions will then be provided followed by a detailed design description.

Object Oriented Computing Environment

In an object oriented computing environment, work is accomplished by sending action request messages to an object which contains data. The object will perform a requested action on the data according to its predefined methods. Objects may be grouped into object classes which define the types and meanings of the data, and the action requests (messages) that the object will honor. The individual objects containing data are called instances of the class.

Object classes can be defined to be subclasses of other classes. Subclasses inherit all of the data characteristics and methods of the parent class. They can add additional data and methods and they can override or redefine any data elements or methods of the parent class. An object may be represented schematically, and is represented herein, by a rectangle including an upper rectangle and a lower rectangle within the object rectangle. The upper rectangle contains the data structure represented by a frame having slots, each of which contains an attribute of the data in the slot. The lower rectangle indicates the object's methods which encapsulate the frame and which are used to perform actions on the data encapsulated in the frame of the upper rectangle.

Figure 1:
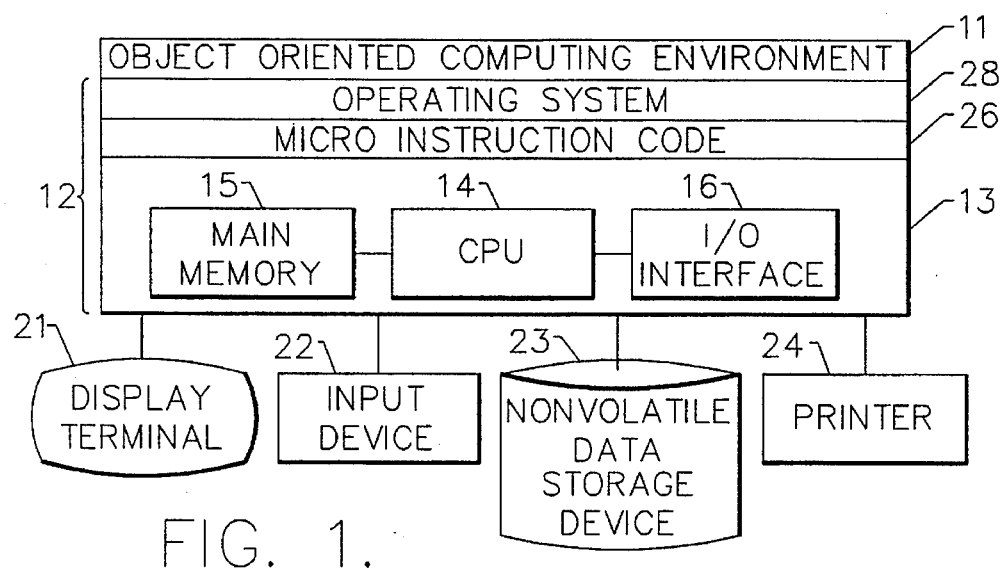
FIG. 1 schematically illustrates a hardware and software environment in which the present invention operates.

Referring now to FIG. 1, a hardware and software environment in which the present invention operates will now be described. As shown in FIG. 1, the present invention is a method and system for supporting Complex Objects within an object oriented computing environment 11 operating on one or more computer platforms 12. It will be understood by those having skill in the art that computer platform 12 typically includes computer hardware units 13 such as a central processing unit (CPU) 14, a main memory 15 and an input/output (I/O) interface 16, and may include peripheral components such as a display terminal 21, an input device 22 such as a keyboard or a mouse, nonvolatile data storage devices 23 such as magnetic or optical disks, printers 24 and other peripheral devices. Computer platform 12 also typically includes microinstruction codes 26 and an operating system.

As shown in FIG. 1, object oriented computing environment 11 operates on computer platform 12. For example, each computer platform 12 may be a computer having an IBM System 370 architecture. However, it will be understood by those having skill in the art that object oriented computing environment may operate across multiple computer platforms. Operating system 28 may be an IBM multiple virtual storage (MVS). Object oriented computing environment 11 is preferably written in Intermediate C, which is an object oriented dialect of the C computer programming language and is similar to the C++ computer programming language. The design'and operation of computer platforms and object oriented computing environments including that of an object manager, are well known to those having skill in the art and are described, for example in U.S. Pat. No. 5,265,206, issued Nov. 23, 1993 to Abraham et al. entitled A Messenger and Object Manager to Implement an Object Oriented Environment; and U.S. Pat. No. 5,161,225 to Abraham et al. entitled Persistent Stream for Processing Time Consuming and Reusable Queries in an Object Oriented Database Management System; U.S. Pat. No. 5,151,987 to Abraham et al. entitled Recovery Objects in an Object Oriented Computing Environment; and U.S. Pat. No. 5,161, 223 to Abraham entitled Resumeable Batch Query for Processing Time Consuming Queries in an Object Oriented Database Management System, all assigned to the assignee of the present invention, the disclosures of which are hereby incorporated herein by reference, and in numerous textbooks such as Object Oriented Software Construction by Bertrand Meyer, published by Prentice Hall in 1988, the disclosure of which is incorporated herein by reference.

Figure 2:
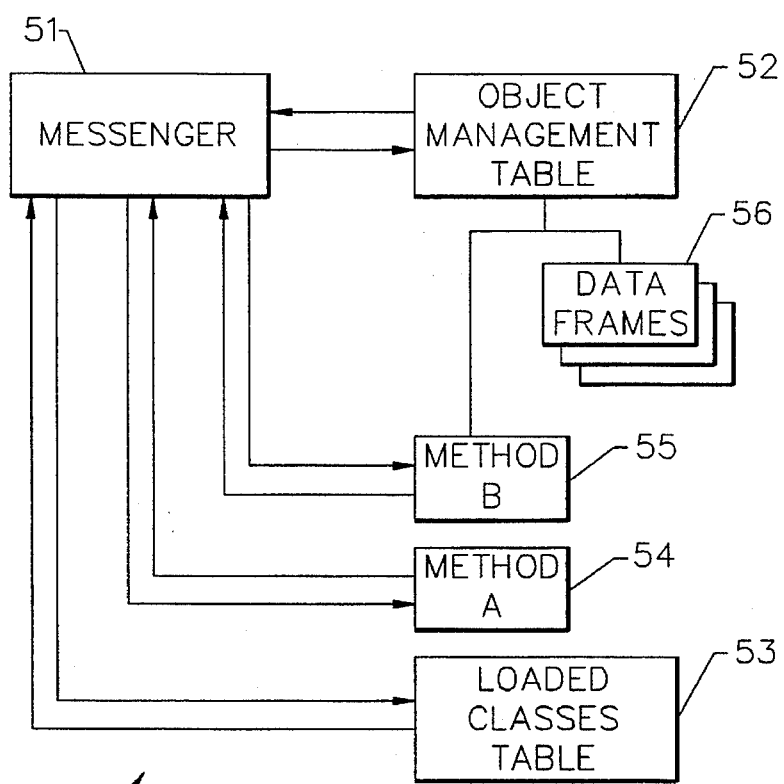
FIG. 2 schematically illustrates the main components of an object oriented computing system.
Figure 5:
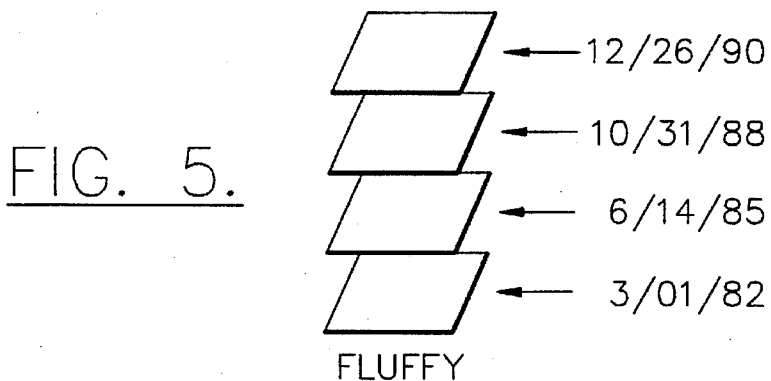
FIG. 5 conceptually illustrates versions which are ordered by time according to the present invention.

Referring now to FIG. 2, which is a reproduction of FIG. 5 of the U.S. Pat. No. 5,313,629, the main components of an object oriented program (11, FIG. 1) will be described. A detailed description of the design and operation of an object oriented program is provided in "Object Oriented Software Construction", by Bertrand Meyer, published by Prentice Hall in 1988, the disclosure of which is incorporated herein by reference.

Referring to FIG. 2, object oriented computing environment 11 includes three primary components: a Messenger 51, an Object Management Table 52 and a Loaded Classes Table 53. The Messenger 51 controls communication between calling and called messages, Object Management Table 52 and Loaded Classes Table 53. Object Management Table 52 contains a list of pointers to all active object instances. The Loaded Classes Table 53 contains a list of pointers to all methods of active object classes.

Operation of the Object Oriented Program 11 will now be described for the example illustrated in FIG. 2, in which Method A (block 54) of an object sends a message to Method B (block 55) of an object. Method A sends a message to Method B by calling Messenger 51. The message contains (1) an object reference of the instance to receive the message, (2) the method the object instance is requested to perform on the data it encapsulates, and (3) any parameters needed by the receiving method. Messenger 51 obtains a pointer to the data frame 56 of the instance object specified by Method A, by searching Object Management Table 52 for the instance object. If the specified instance object cannot be found, Object Management Table 52 adds the instance object to the table and calls the instance to materialize its data from the database. Once in the instance table, Object Management Table 52 returns the pointer to the materialized instance object.

Messenger 51 then obtains the address of Method B from the Loaded Classes Table 53. If the instance's class is not loaded, the Loaded Classes Table 53 will load it at this time to materialize its data. The Loaded Classes Table 53 searches for the specified method (Method B) and returns the address of the method to Messenger 51.

The Messenger 51 then calls Method B, passing it a system data area and the parameters from the call made by Method A including the pointer. Method B accesses the data frame 56 using the pointer. Method B then returns control to the Messenger 51 which returns control to Method A.

Figure 3:
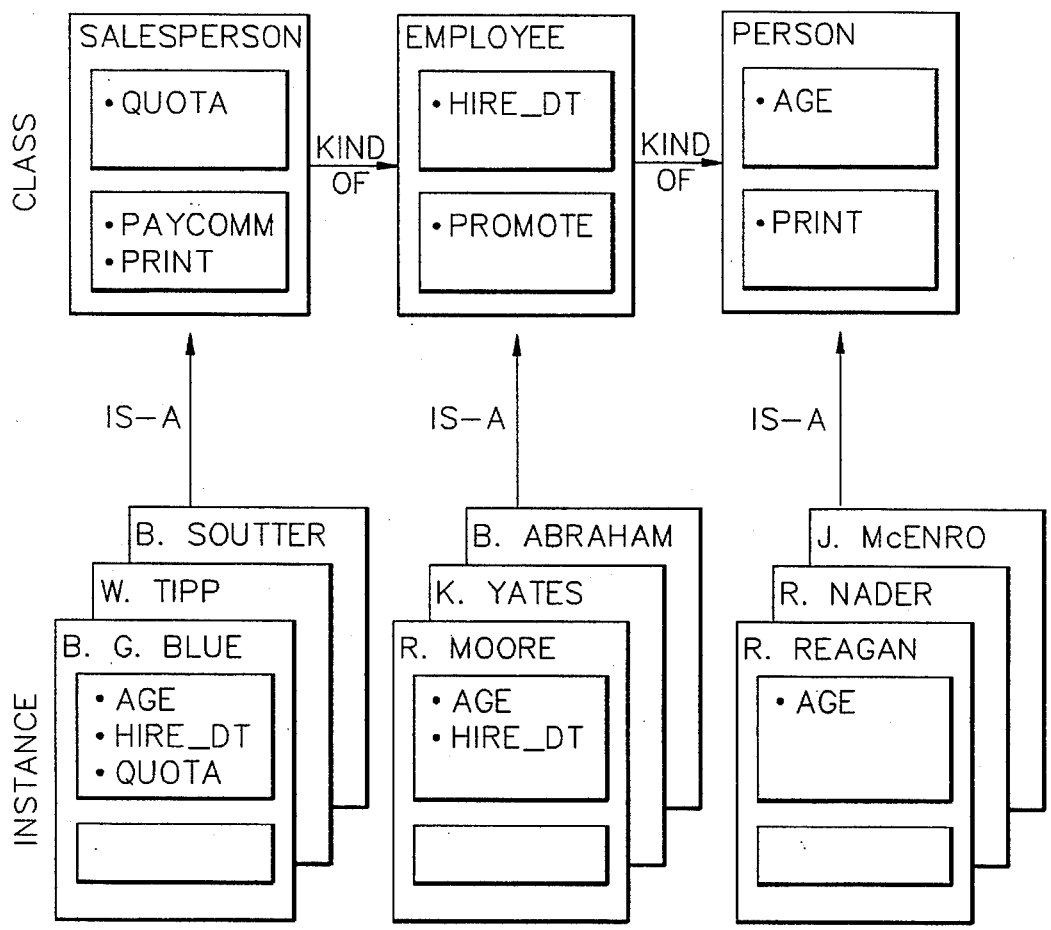
FIG. 3 illustrates an example of an inheritance hierarchy in an object oriented computing system.

FIG. 3 illustrates an example of an inheritance hierarchy in an object oriented computing platform. As shown, three object classes are illustrated for "salesperson" "employee" and "person", where a salesperson is a "kind of" employee, which is a "kind of" person. In other words, salesperson is a subclass of employee and employee is the superclass of salesperson. Similarly, employee is the subclass of person and person is the superclass of employee. Each class shown includes three instances. B. Soutter, W. Tipp and B. G. Blue are salespersons. B. Abraham, K. Yates, and R. Moore are employees. J. McEnroe, R. Nader, and R. Reagan are persons. In other words, an instance is related to its class by an "is a" relation.

Each subclass "inherits" the frames and methods of its superclass. Thus, for example, a salesperson frame inherits age and hire date objects from the employee's superclass as well as promote methods from the employee superclass. Salesperson also includes a unique quota attribute and a pay commission method. Each instance can access all methods and frames of its superclass, so that, for example, B. G. Blue can be promoted.

Version Control Method and System: Overall Design and Operation

Figure 4:
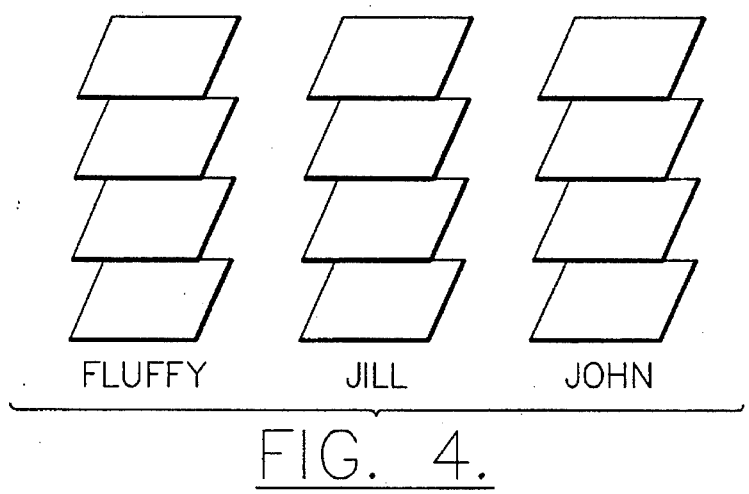
FIG. 4 conceptually illustrates three objects, each of which includes a plurality of versions according to the present invention.

The general concept of version control implies that there are a plurality of versions of a selected object. For purposes of illustration, three objects will be illustrated: a person object "Jill", a person object "John" and a cat object "Fluffy". As shown in FIG. 4, each of these objects includes a plurality of versions. For example, versions of Fluffy can be Fluffy at birth, Fluffy at age 10, and Fluffy the kitten. A logical key identifies a selected object which may have many versions. Thus, for example, assume there is a stack of photographs of Fluffy, each representing a "version". There are also photographs of Jill and John. In order to sort the photographs, the logical key of Fluffy, Jill and John are used. Assume further that the photographs have been developed on slides, and a selection sequence is being developed to decide which slide to view on a slide projector. Since only one slide can be viewed at any time, it is important that the selection criteria result in only one slide. The first selection was by logical key (e.g. "Fluffy") but there are many versions of Fluffy to choose from.

One way of selecting versions is by time. This would involve selecting by date (for example, show me Fluffy as of last week) or status (for example, show me Fluffy as a kitten). Note that the time selection criteria may not have an exact match for the version. The version that will be selected will be the one that was valid "at that time", as illustrated in FIG. 5.

Figure 6:
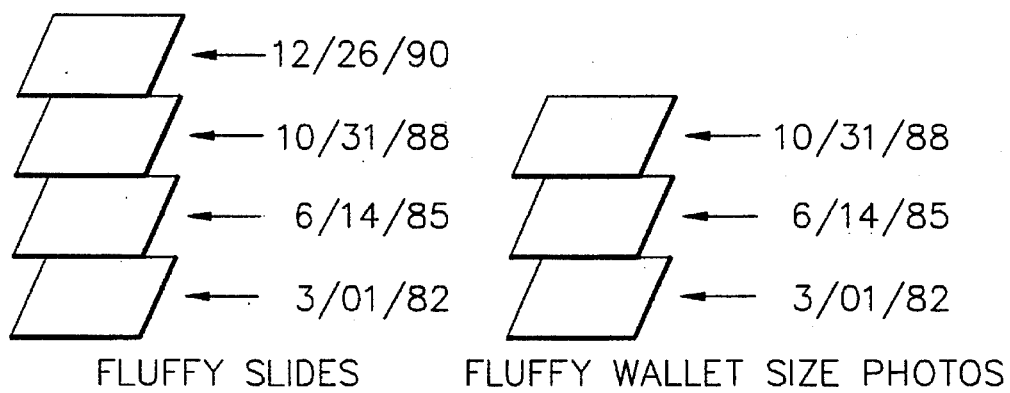
FIG. 6 conceptually illustrates versions of an object having different perspectives according to the present invention.

Moreover, two versions of the same object can both be valid at the same time. Thus, there may be the same picture of Fluffy as a slide, an 8×10, a 3×5 and a wallet size, as shown in FIG. 6. Thus, a full qualification to select a picture would include the logical key (example: Fluffy), date (example: yesterday), and perspective (example: wallet size).

It will be recognized that in the above described example, time selection was relatively simple. A date/time stamp can be applied to each picture and the date/time stamp provides a unique identification for selecting a version. For other types of version control, this may not be true. Thus, the present invention provides means for assigning each version a time order so that it can be selected unambiguously.

Figure 7:
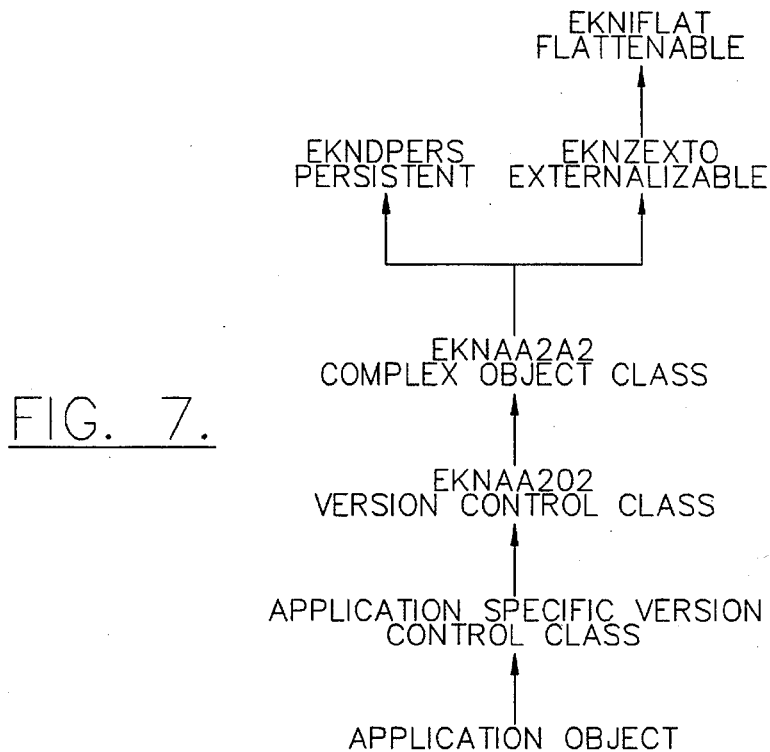
FIG. 7 illustrates a class hierarchy including a version control class according to the present invention.

Version controlled objects may operate in connection with complex objects and externalizable objects as illustrated in the class hierarchy of FIG. 7. The complex object class is described in application Ser. No. 08/101,913 entitled System and Method for Supporting Complex Objects in an Object Oriented Computing Environment, filed concurrently herewith and assigned to the assignee of the present invention, the disclosure of which is hereby incorporated herein by reference The externalizable object class is described in U.S. Pat. No. 5,432,925 issued Jul. 11, 1995 entitled System and Method for Providing a Uniform External Interface for an Object Oriented Computing System, the disclosure of which is hereby incorporated herein by reference.

Figure 8:
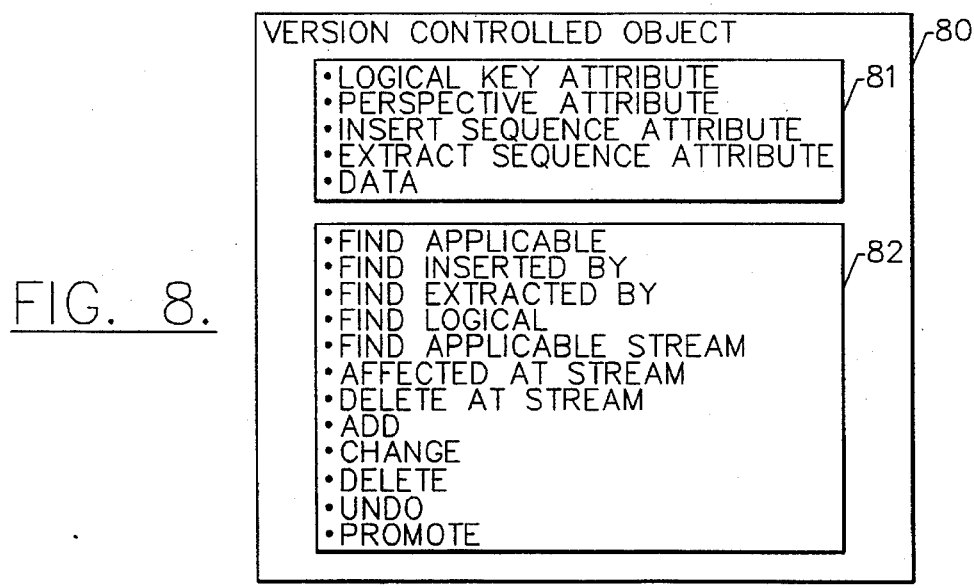
FIG. 8 illustrates a version controlled object according to the present invention.
Figure 10A:
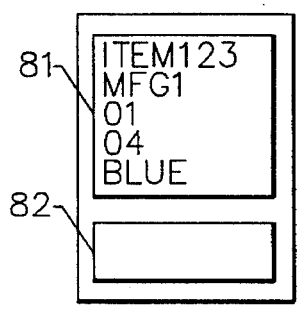
FIGS. 10A–10C illustrate three versions of an object according to the present invention.
Figure 10B:
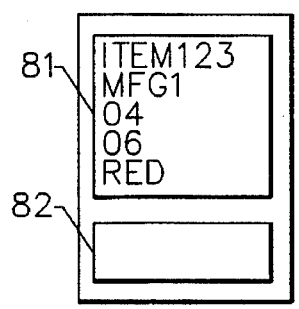
Figure 10C:
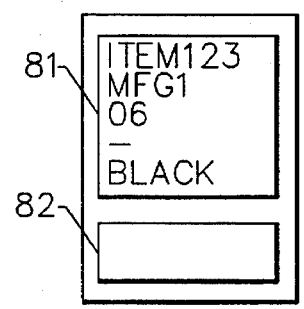

Referring now to FIG. 8, a version controlled object 80 according to the present invention, is illustrated. Each version controlled object 80 includes the following attributes 81: logical key, perspective, insert sequence, extract sequence and data. The logical key attribute provides identification of the version controlled object. Each version of the version controlled object is identified by a logical key, an insert sequence and an extract sequence. Version controlled objects are specializations of simple objects which participate in a complex object, and the logical key for version controlled objects is the same as the logical key for complex object subobjects. However, in the case of a version controlled object, logical key only identifies an instance of the object up to version selection. The exact version selection is achieved by providing a selection sequence value, which is then compared to the insert and extract sequence attributes. FIGS. 10A–10C illustrate three versions of an object. These versions will be used to illustrate operation of the methods 82 for version controlled objects.

Figure 9:
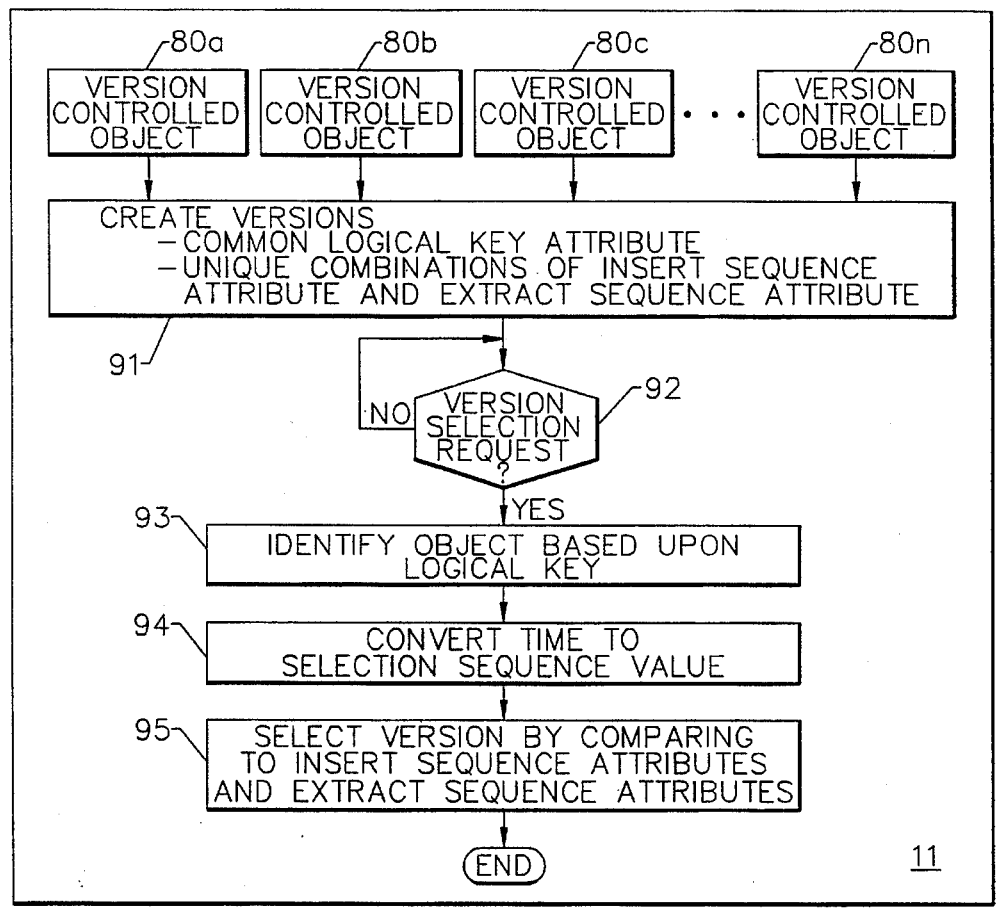
FIG. 9 illustrates operations for creating and selecting versions according to the present invention.

FIG. 9 summarizes operations for creating and selecting versions according to the present invention. As shown, a plurality of version controlled objects 80a ... 80n are present in the object oriented computing environment 11. As shown at Block 91, versions are created for a selected one of the objects 80a ... 80n by placing a common logical key attribute in the frame of each version and by generating a unique combination of an insert sequence attribute and an extract sequence attribute for each version. The insert and extract sequence attributes are created using the add, delete, change, undo and promote methods 82 of FIG. 8, described below.

Still referring to FIG. 9, when a version selection request is received at Block 92, an object is identified based upon the logical key, at Block 93. The selection request includes a version identifier such as version time. At Block 94 the version time is converted into a selection sequence value. This conversion may be unique for each application which uses version control. However, the end result is a sequence value.

Still referring to FIG. 9, as shown at Block 95, a version is selected by comparing the selection sequence value to the insert sequence attributes and the extract sequence attributes of all of the versions using one of the find methods 82 described below.

Formal methods in the version controlled object are defined using only the abstract properties of the logical key and insert and extract sequence. In other words, selection of version controlled objects requires a full or partial logical key value, a perspective value and a selection sequence value. In the discission that follows, unless it is explicitly mentioned, perspective is considered to be part of the logical key. The logical key for an instance of an object may be compared against a logical key used for selection. The comparison may be against a full or partial logical key. In the case of comparison against a partial logical key, the partial logical key will be that of the immediate complex object ruler of the object being selected, and a stream of objects matching the partial logical key will be generated. As known to those having skill in the art, a stream is a linked list of all instances that match a search criteria. The insert sequence and extract sequence are long integers. They will be compared to the selection sequence value.

Referring again to FIG. 8, the following methods 82 are defined for a version controlled object:

1. Find Applicable: This method selects the version controlled object that satisfies all of the following:
    a. Logical key matches the passed logical key.
    b. Insert sequence attribute is less than or equal to the selection sequence value.
    c. Extract sequence attribute is greater than the selection sequence value. This assumes that "unextracted" is larger than any sequence number.

2. Find Inserted By: This method selects the version controlled object that satisfies all of the following:
    a. Logical key matches the passed logical key.
    b. Insert sequence attribute is equal to the selection sequence value.
3. Find Extracted By: This method selects the version controlled object that satisfies all of the following:
    a. Logical key matches the passed logical key.
    b. Extract sequence attribute is equal to the selection sequence value.
4. Find Logical: There is a match on logical key (regardless of the insert and extract sequence attributes). This method returns a boolean true if there is a matching object, rather than the object itself, since there may be multiples.

In addition streams are provided to support complex object processing. The streams will take as selection the logical key of the immediate ruler, which in some cases is a partial logical key of the type of object selected in the stream. The following methods are provided for selection of a stream.

1. Find Applicable Stream: Selection is the same as Find Applicable, except that a partial logical key is used.
2. Affected At Stream: This method selects the stream of version controlled objects that satisfies all of the following:
    a. Logical key matches the passed logical key.
    b. Insert sequence attribute is less than or equal to the selection sequence value.
    c. Extract sequence attribute is equal to or greater than the selection sequence value.

The affected at stream is used during complex object actions such as promote, promote verify, and undo which must find all objects touched by a particular version (either as an insert or extract). This stream includes objects which are applicable at the version but not directly affected (i.e. the insert sequence is less than and the extract sequence is greater than the selection sequence value) because these objects may have subobjects which are directly affected by the version (i.e. the insert or extract sequence matches the selection sequence number).

3. Delete At Stream: This method selects the stream of version controlled objects that satisfies all of the following:
    a. Logical key matches the passed logical key.
    b. Extract sequence attribute is greater than the selection sequence value.

This stream will include objects which are applicable at the version (i.e. insert sequence is less than or equal to the version selection sequence), and also objects which are future to the version to be deleted (i.e. the insert sequence is greater than the selection sequence). The future levels are included in the stream for verification purposes.

Update methods are provided which again make use of the formal properties described above. In addition, these methods make use of generic methods available to all persistent objects, such as generic copy, which will make an exact copy of an instance of an object to a new instance, and physical delete, which will delete the data for an instance of an object from the database. Update methods are also provided within the context of complex object support. However, the first level of support for version control is at the individual instance (the "simple object") level. The following simple object update methods are provided. As input, they require a logical key value, a selection sequence value and new data for add and change:

1. Add: This method is called after a new version controlled instance has been created during File.New processing or equivalent batch processing, to ensure that there is not a matching object already in existence, and to set up the insert and extract sequence numbers.

a. Verification: There is no instance of the same type of class (Item Master Data, BOM Component, etc.), with the same logical key. This uses the "find_logical" method.

b. Processing: Set insert sequence attribute to the specified sequence number, and the extract sequence attribute to the high value for the range of sequence numbers for the specified sequence number. The default is the maximum value for long integers.

c. Object Specific Verifications: A conditional method (child_add_ver) is provided for additional object specific verifications.

Figure 11:
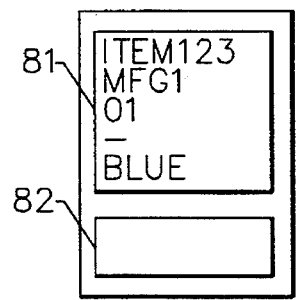
FIG. 11 illustrates operation of an add method according to the present invention.

FIG. 11 illustrates operation of the add method. As shown, the add method creates a new instance using the logical key. It is inserted by the specified sequence and is unextracted.

2. Change: Change processing is enhanced to keep copies of various versions of the "same" data (same logical key), with different insert sequences (indicating the sequence which established that version of the data). As revisions are made, the extract sequence of the "old" version is updated to match the insert sequence number of the "new" version.

a. Verification: Use the "find_applicable" method to select a version controlled object for update. If none is found, fail the verification.

Figure 12A:
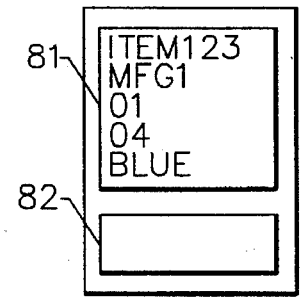
FIGS. 12A–12B illustrate operation of a change method according to the present invention.
Figure 12B:
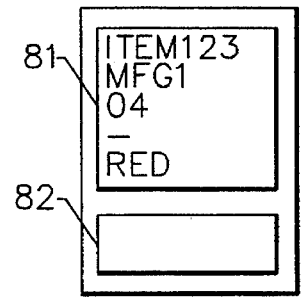

If change is performed by selection from a list, the list should be generated using the "find applicable stream" with a partial logical key, or a stream that is equivalent. The complex object menu panel EKNATPAN uses a gen_display_str method, which allows the applicable stream to be sorted in a different order for display purposes. However, the selection criteria should remain the same.

b. Processing:
        1. If the selected version controlled object has future levels of data (this is true if there is another object with matching logical key whose insert sequence matches the extract sequence number of the object selected for update) issue a message warning that this level of the variants of data represented by the logical key has changed, and that any future levels (which were originally established as deltas to this level of data) may now be invalid. It will be up to the user to make the appropriate updates to the future levels.
        2. If the selected instance is inserted by the specified level, data is updated in place.
        3. If the specified level does not insert the instance, a new version instance must be created to record the change in the data fields:
            a) Create an exact copy of the selected instance, using the generic copy available for all frame objects.
            b) Logically delete the copy by making the extract sequence number the specified number.
            c) Change the insert sequence of the selected instance to the specified sequence number. This instance will now be updated by online or batch processing.

c. Object Specific Verifications: A conditional method (child_change_ver) is provided for additional object specific verifications. FIGS. 12A–12B illustrate operation of the change method.

Figure 13A:
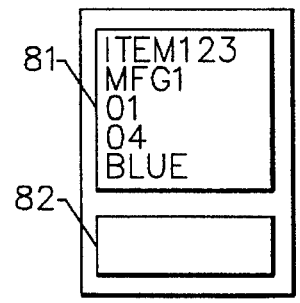
FIGS. 13A–13B illustrate operation of a delete method according to the present invention.
Figure 13B:
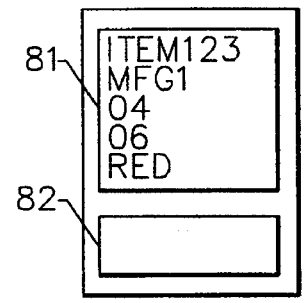
Figure 14A:
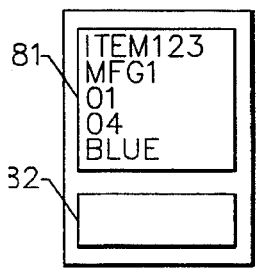
FIGS. 14A–14C and 15A–15B illustrate operation of an undo method according to the present invention.
Figure 14B:
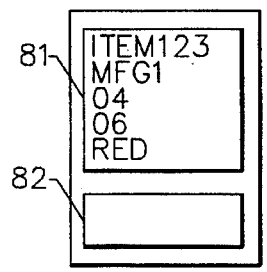
Figure 14C:
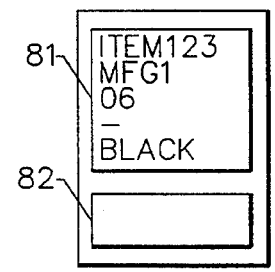
Figure 15A:
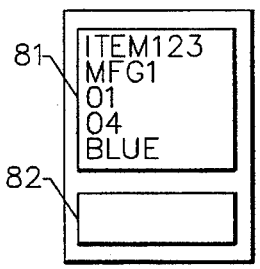
Figure 15B:
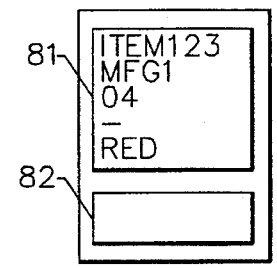

3. Delete: The delete method is enhanced to do "logical" deletes if the specified version did not originally establish the data.

a. Verifications:
        1. Select the Version Controlled Object using the find_applicable method. Fail verifications if none is found. If delete is performed by selection from a list, the list should be generated using the "find applicable stream" with partial logical key, or a stream that is equivalent. The complex object menu panel EKNATPAN uses a gen_display_str method, which allows the applicable stream to be sorted in a different order for display purposes. However, the selection criteria should remain the same.
        2. If the selected instance has an extract sequence number (which is not the maximum value for that range of sequence numbers) there must not be any instance of the Version Controlled Object with the same logical key with matching insert sequence number. This uses the find_inserted_by method, passing the extract sequence number.

b. Processing:
        1. If the selection sequence value is equal to the insert sequence number, the instance is physically deleted.
        2. If the selection sequence value is not equal to the insert sequence attribute, the extract sequence attribute is set to the selection sequence value.

c. Object Specific Verifications: A conditional method (child_delete_ver) is provided for additional object specific verifications. FIGS. 13A-13B illustrate operation of the delete method.

4. Undo: The undo method is unique to version controlled objects. It removes the effect of a particular version on a set of objects which are versions of the same thing; i.e. they all have the same logical key. This method is used to roll back the affects of an informal version, if it was not approved.

a. Verifications: The selected instance must satisfy either of the following:
        1) Insert sequence matches the selection sequence value.
        2) Extract sequence matches the selection sequence value.

b. Processing: An attempt is made to find an inserted instance, using the find_inserted method passing the specified logical key and sequence number, and an extracted instance, using the find_extracted method passing the specified logical key and sequence number.
        1. If there is both an inserted and extracted instance of version controlled object (it has been releveled by the specified level);
            a) The extract sequence in the extracted instance is reset to the extract sequence in the inserted instance.
            b) The inserted instance is physically deleted.
            c) A future instance has the same logical key and an insert sequence which is the same as the extract sequence of the inserted instance. If there is a future instance, a warning message is issued, since data on the future instance may be used on data established by the version which is being removed.
        2. If there is only an inserted instance, it is deleted.
        3. If there is only an extracted instance it becomes unextracted.

Object Specific Verifications: A conditional method (child_undo_ver) is provided for additional object specific verifications. FIGS. 14A–14C and 15A–15B illustrate operation of the undo method before undo of sequence 06 and after undo of Sequence 06.

5. Promote_i: The promote method is unique to version controlled objects. It is used when the associated versions have status values, and a specific version changes status. This is the mechanism by which an informal version becomes formalized. When this occurs, two things can happen:

a. The sequence number associated to the version changes. This is because each status may have its own range of sequence numbers, or a unique sequence number is associated to a particular status value.
   b. The logical key changes. This happens if the progression is to the new status also involves a change in perspective, since the perspective identifiers are part of the logical key. For example, this happens when the status of an item is changed from release to accept and the data is moved into a manufacturing view.

To handle these possibilities, promote processing takes as input the old logical key, the old sequence number, the new logical key, and the new sequence number.

a. Verifications: The verifications performed depend on whether the insert or extract sequence and old key are different:
      1) If the extract sequence matches the old sequence number:
         a) A conflict check is done to ensure that the insert has already been promoted to the new status.
         b) Delete verifications are called to ensure that it is okay to promote the delete. This check makes sure first that it is a delete and not a relevel.
      2) If insert sequence matches the old sequence a conditional method (child_ver) is called to invoke object specific verifications. The proposed new sequence number and new partial logical key are passed as parameters. If the new key and old key match, then a "conflict check" verification is done. This verifies that the insert sequence is less than the proposed new sequence number. If the old key and new key do not match, the version control metaclass is used to find a match for the insert sequence in the new perspective. The conflict check is done there. No delete check is done in this case. However, this is the last part of the method down that particular logic path, so a child could redefine this method to add delete checks when perspective is changed. The redefined method should call
   this method first and then add its own logic for the delete check.

Promote verifications can be called independently of the actual promote action. If the old sequence and new sequence match, then this is considered a reverification of existing data, and all data applicable at the old sequence is verified using the same rules used for data inserted by the old sequence.

b. Processing:
      1) If the new key and old key match: A check is made that insert sequence or extract sequence match the old sequence number. The matching one is undated to the new sequence number. If, after the update, insert sequence is equal to the extract sequence number, the instance is physically deleted.
      2) If the new key and old key do not match: Instead of a change in place, data is copied into the new perspective (as indicated by the new key). It is possible that other fields in the key may also change as part of the promotion. This is the case, for example, with BOM Components promoted to accept. To allow for this, the new key is passed to the determine_key method, which determines the pre_target_key (the key of the instance in the target perspective at selection sequences lower than the new sequence number) and the post_target_key (the key of the instance in the target perspective at the new sequence number). These would be different in the case of, for example, accept processing of a BOM Component which had a substitute for a given location and the substitute number changed.

If the pre_target_key and post_target_key are different, cleanup_key_i is called to adjust the target key for any subobjects of this object. This is done in a separate unit of work (and the unit of work is committed), to make sure that when the subobjects process they have the correct target key.

Version Control Method and System: Detailed Design and Implementation

A detailed design implementation of a version control method and system will now be described. This detailed design and implementation combines version control with complex object support as described in application Ser. No. 08/101,913, the disclosure of which is incorporated herein by reference. Methods which are used with version control are indicated by a "i" and methods which are used with complex object support are referred to by a "_c".

Figure 16:
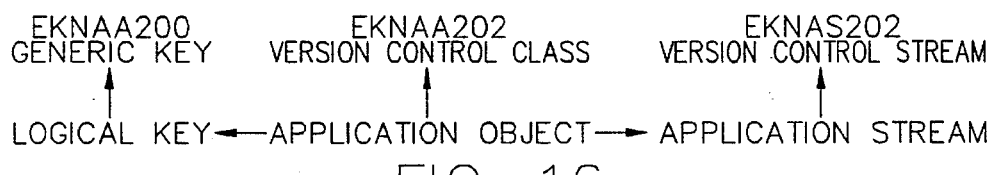
FIG. 16 illustrates a class hierarchy including a version control class and a version control stream according to the present invention.

Version controlled objects are specifications of complex object subobjects. The promote and undo methods also operate as complex object actions. The promote_i and undo_i methods both call promote_c and undo_c respectively for all subobjects. The promote_c and undo_c methods work like copy_c and delete_c, except that they use the affected at stream to select instances. In order to provide this generic complex object processing, each application object has a logical key attribute, which inherits from the Generic Logical Key (EKNAA200). The application object is associated to a stream which must inherit from the version object stream class (EKNAS201), which itself inherits from the complex stream class EKNAS2A1. See FIG. 16.

Version control makes the ruler to subobject relationships more complicated. These relationships are logical key to logical key, and must be resolved by finding instances of both a ruler and subobject which are applicable at a particular version. This uses the find applicable method and its associated stream. An object which has subobjects cannot be deleted. This becomes more difficult to enforce when the ruler and subobjects are version controlled, since a subobject may have an applicable ruler which was established at an earlier version (lower insert sequence number) than the subobject. Deletion of the ruler at its insert sequence number would leave the subobject dangling. To prevent this, the "delete at" stream, used to select subobjects during the cascade of delete, includes any future instances. The delete verifications will fail the entire delete if a future instance, i.e. one with insert sequence greater than the delete sequence, is encountered.

Figure 17:
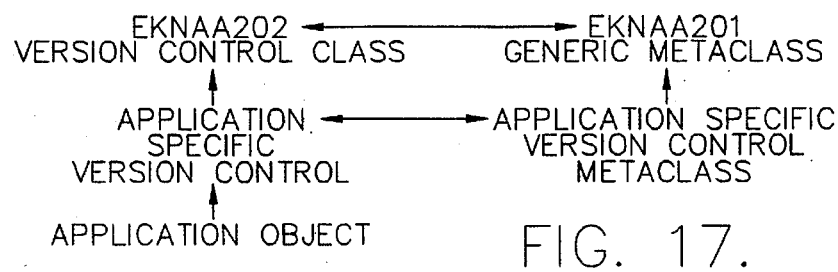
FIG. 17 illustrates a class hierarchy including an application specific version control metaclass according to the present invention.

The processing described above uses the formal properties of logical key, insert sequence number, and extract sequence number without reference to their "meaning" in user terms. A version control mechanism is the additional function that interprets this data, using application specific rules and structures. These mechanisms are isolated into metaclasses to provide maximum flexibility, and are specializations of the application metaclass provided as a part of complex object support. See FIG. 17. The name of the metaclass is a class attribute of EKNAA202. The application specific version control class just has to redefine this name to point to the application specific version control metaclass.

The following methods are provided in EKNAA201 which can be redefined by a specific version control mechanism. They are the formal behaviors of a version control mechanism which are invoked by EKNAA202 during its processing:

1. update_allowed: Verifies that the version selection can be updated. This method will be redefined by each type of version control to call update_allowed on the version selection object (described below) if there is one, or to return an answer directly based on the input parameters. It is passed the version controlled object, which must have its ruler list set up, and the sequence number of the version being used for update. Note that the ruler list will include information about the version. This will typically be specialized by each version control mechanism to identify informal versions (which allow update) from formal ones (which can no longer be updated).

2. open_allowed: Verifies that the version selection can be retrieved. This method will be redefined by each type of version control to call open_allowed on the version selection object (if there is one), or to return an answer directly based on the input parameters. It is passed the version controlled object, which must have its ruler list set up, and the sequence number of the version being used for open. This method can be specialized to restrict the display of informal versions.

3. version_name: This method uses the logical key and sequence number to determine the name. If there is a version selection object, it will locate it and interrogate it to determine the name.

4. find_sequence: This method uses the logical key and time selection to determine the sequence. If there is a version selection object, it will locate it and interrogate it to determine the sequence number. The time selection criteria may be name, status, or date.

5. build_ruler_list: This method builds the ruler list from internal attributes of the passed version controlled object. It is used when a background interface is processed.

6. ruler_seq: This method finds sequence number for the currently processed version. It uses the version control information in the ruler list of the version controlled object which is passed in as a parameter.

7. find_match: This method finds the best match for the current version in a different perspective. This method finds the new sequence number based on the old and new perspective and the old sequence number. The base application metaclass EKNAA201 makes all these methods effective, with a default of no version control.

If named versions are used, then the mechanism to match names to versions requires the use of a version selection object which maps the name to a selection sequence number. A metaclass, EKNAA300 is provided, which inherits from EKNAA201 and provides additional support. EKNAA300 assumes that there is a version selection object, and possibly a controlling object for the complex object (the ruler), and the perspective. For example, the version selection object may be the item affected (EUOEB700) or location item affected (EUOEB701), and ruler would be the item master (EUOSB201) and the perspective would be the Location (EKNXLOC). As this example illustrates, there may not be uniformity in the types of classes involved. The only assumption within EKNAA300 is that they are all frames (so that they can be included in the ruler list). EKNAA300 provides a combination of effective and deferred methods which can be implemented by each version control mechanism to deal with its type of ruler, perspective, and version selection object, and provide a smooth interface to the effective methods in EKNAA300. The following methods are provided in EKNAA300:

1. add_persp: This method adds the perspective to the ruler list.

2. add_ruler: This method adds the ruler to the ruler list.

3. add_vso: This method adds the version selection object to the ruler list.

4. build_ruler_list: This method builds the ruler list from internal attributes. It uses the deferred methods find_masters and find_vso to find the ruler, the perspective, and the version selection Object, and then uses add_ruler, add_persp, and add_vso.

5. find_masters: This is a deferred method which uses the logical key to find the ruler and perspective.

6. find_match: This method takes a sequence number, a current logical key, and a new logical key, and finds the matching sequence number in a different perspective identified in the new logical key. It does this by finding the version name that matches the sequence number and current key, and then finding the sequence number that matches the name and new key (using find_sequence).

7. find_sequence: This method is redefined to use find_vso, and then use get_sequence to read the sequence number from the version selection object.

8. find_vso: This method uses the logical key and other criteria to find the version selection object. Logical key will be used to determine which stack of version selection objects to use, and the other time selection criteria (name, status, date, or sequence) will be used to select one version selection object from within the stack. This is a deferred method.

9. get_sequence: This method returns the sequence number of the passed version selection object. This method is deferred because it is not known what kind of object the version selection object is.

10. masters list: This deferred method finds the ruler and perspective in the ruler list of the working instance. It is provided for open_allowed and update_allowed so that they can redirect the decision to the ruler and perspective object.

11. open_allowed: This method redirects the decision to the ruler, perspective, and version selection objects. It is assumed that they control the relevant complex object locks.

12. persp_open: This method verifies that the perspective allows subobjects it controls to be viewed by the user.

13. persp_update: This method verifies that the perspective allows subobjects it controls to be updated by the user.

14. ruler_open: This method verifies that the ruler allows subobjects it controls to be viewed by the user.

15. ruler_update: This method verifies that the ruler allows subobjects it controls to be updated by the user.

16. status_type: This method isolates the status decision in the find object method. The decisions here are defaulted to always return the "A" decision, described below. It makes the decision by comparing the old key with the new key to see if perspective changed, by analyzing the status of the version, and by checking the effectivity.

17. update_allowed: This method redirects the decision to the ruler, perspective, and version selection objects. It is assumed that they control the relevant complex object locks.

18. vso_list: This deferred method finds the version selection object in the ruler list of the working instance.

It is provided for open_allowed and update_allowed so that they can redirect the decision to the version selection object.

19. vso_open: This method verifies that the version selection object allows subobjects it controls to be viewed by the user.

20. vso_update: This method verifies that the version selection object allows subobjects it controls to be updated by the user.

The find_object method (defined on EKNAA201) is used to find objects for cross object verifications. Given the source logical key and source sequence, and the target logical key, which may be in a different complex object structure or perspective, it determines the "best" version of the object matching the target key to get, and retrieves it. A class reference to the type of object desired is also passed in, so that find methods can be sent to it. In EKNAA201, this method uses the passed sequence number and the new logical key, and invokes the find_applicable method. In EKNAA300, it is specialized to make decisions based on the perspective differences indicated by the old key and new key, and the type of decision, which is determined by the status_type method.

The following decision patterns are supported:

1. DECISION "A": The passed sequence number is globally valid for all complex objects in the application. The data should be selected using the new key, the passed sequence, and find_applicable.

2. DECISION "B": The passed sequence number is only valid within the scope of the complex object identified by the old key. However, the name of the associated version, identified by the version selection object, makes sense across other complex objects. If there is a version selection object with matching name on the complex identified by the new key, use its sequence number, and the find_applicable method, to select data for the new key. Otherwise, find the version selection object which is the best match by status (and possible effectivity) and use find_applicable.

3. DECISION "C": The passed sequence number is only valid within the scope of the complex object identified by the old key. However, the name of the associated version, identified by the version selection object, makes sense across other complex objects. If there is a version selection object with matching name on the complex identified by the new key, use its sequence number, and the find_inserted_by method, to select data for the new key. If the data is not directly affected by the version selection object, or there is no version selection object, find the version selection object which is the best match by status, (and possibly effectivity) and use find_applicable.

4. DECISION "D": The passed sequence number is only valid within the scope of the complex object identified by the old key. As an additional complication, the new key identifies a different perspective. The name of the associated version, identified by the version selection object, makes sense across other complex objects in the perspective associated to the old key (but not necessarily in the perspective indicated by the new key). If there is a version selection object with matching name on the complex object identified by the new key, but in the perspective identified by the old key, use its sequence number, and the find_inserted_by method, to select data for the new key. This also requires that the new key be modified to select data in the perspective indicated by the old key. If the data is not directly affected by the version selection object, or there is no version selection object, find the version selection object which is the best match by status (and possibly effectivity), for the complex object identified by new key in its perspective, and use find_applicable.

5. DECISION "E": The passed sequence number is only valid within the scope of the complex object identified by the old key. The version name is not of any significance across complex objects. Find the version selection object which is the best match by status (and possibly effectivity), for the complex object identified by new key in its perspective, and use find_applicable.

Figure 18:
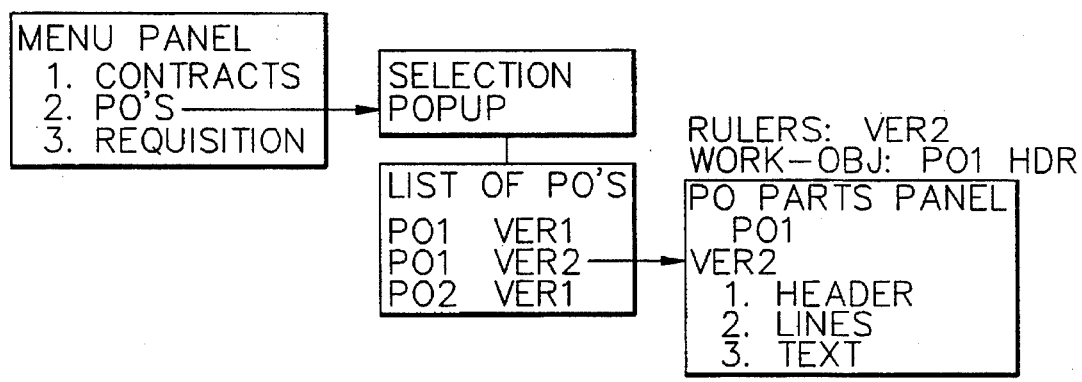
FIG. 18 illustrates an example of the presentation of version controlled objects according to the present invention.

The presentation of version controlled objects is a specialization of the presentation of complex objects. The initial selection panel of lists of complex objects will also include version selection for those objects. This may be done by including user version selection criteria on the selection popup which precedes the list panel, or by having the list panel show several versions of the same complex object. FIG. 18 illustrates an example using the purchase order complex object. A list of purchase orders would be selected from a main menu panel. The selection popup restricts the purchase orders that appear in the list. In this case, several versions of the same complex object appear in the list. Note that information about the version selection, in this case a version selection object for version 2, is included in the ruler list passed to the initial parts panel. This version information becomes part of the focal point data for all related panels, and the version selection object is included in all subsequent ruler lists.

Complex object support provides generic support for using stream and find methods to open list and data entry panels from the parts panel. These methods are further refined here to make use of the version control information contained in the ruler list. The ruler_seq method on the version control metaclass is used to get the sequence number associated to the version. This is then used to find the objects applicable at that version (either one or a stream).

The change method in EKNAA202 allows an informal version to be established based on data in a formalized version. The update_allowed method in EKNAA202, EKNAA201 and EKNAA300 is used to block updates using a formal version. The promote method in EKNAA202 is used to promote a version from informal to formal status. The promote verifications can be used as a part of the approval process. The undo method in EKNAA202 can be used to remove the affect of a version which is not approved.

The use of insert and extract sequence numbers to select data to be presented at a particular version means the same data may be applicable at many different versions. The change method in EKNAA202 will create a new version of a simple object when that version actually changes the data in the simple object. Other simple objects belonging to the same complex object will not be affected. It may happen that an object is not directly affected by a version, but its subobjects are. The selection of objects for complex objects actions such as delete, promote and undo is adjusted for this, through the use of the "delete_at" and "affected_at" streams.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A system for controlling versions of selected objects in an object oriented computing system on a computing platform, each object including an object frame containing data attributes and at least one object method for performing actions on the associated object, said version controlling system comprising:

means for creating a plurality of versions of a selected object, the data frame of each of said plurality of versions including a common logical key attribute, the data frame of each of said plurality of versions including a unique combination of an insert sequence attribute and an extract sequence attribute;

means, responsive to a selection request, for identifying said plurality of versions of said selected object based upon the common logical key attribute associated therewith;

means, responsive to said selection request and to a version identifier, for converting said version identifier into a selection sequence value; and means, responsive to said selection sequence value, for selecting at least one of said plurality of versions of said selected object by comparing said selection sequence value to at least one of said insert sequence attributes and said extract sequence attributes.

2. The version control system of claim 1 wherein said selecting means comprises first means for identifying one of said versions of said selected object having an insert sequence attribute which is less than or equal to said selection sequence value, and an extract sequence attribute which is greater than said selection sequence value.

3. The version control system of claim 2 wherein said selecting means further comprises second means for identifying one of said versions of said selected object having an insert sequence attribute which is equal to said selection sequence value.

4. The version control system of claim 3 wherein said selecting means comprises third means for identifying one of said versions of said selected object having an extract sequence attribute which is equal to said selection sequence value.

5. The version control system of claim 4 wherein said selecting means comprises fourth means for identifying at least one of said versions of said selected object having an insert sequence attribute which is less than or equal to said selection sequence value, and an extract sequence attribute which is greater than or equal to said selection sequence value.

6. The version control system of claim 5 wherein said selecting means comprises means for identifying one of said versions of said selected object having an extract sequence attribute which is greater than said selection sequence value.

7. The version control system of claim 1 wherein the data frame of each of said plurality of versions further includes a perspective attribute, and wherein said selecting means is further responsive to a perspective value for selecting at least one of said plurality of versions of said selected object by comparing said selection sequence value to said insert sequence attributes and said extract sequence attributes and by comparing said perspective value to said perspective attribute.

8. The version control system of claim 1 wherein said creating means comprises means for adding a new version to said plurality of versions.

9. The version control system of claim 8 wherein said creating means further comprises means for changing at least one data attribute of at least one of said plurality of versions.

10. The version control system of claim 9 wherein said creating means further comprises means for deleting at least one of said plurality of versions.

11. The version control system of claim 9 wherein said creating means further comprises means for undoing the effect of at least one of said plurality of versions.

12. The version control system of claim 11 wherein said creating means further comprises means for promoting at least one of said plurality of versions from an informal status to a formal status.

13. The version control system of claim 1 wherein said version identifier is a version time, said converting means comprising means for converting said version time into a selection sequence value.

14. The version control system of claim 1 wherein said version identifier is a version name, said converting means comprising means for mapping said version name to a selection sequence value.

15. The version control system of claim 1 wherein said selecting means comprises means for selecting a best version of said plurality of objects from a plurality of complex objects.

16. The version control system of claim 1 further comprising means for presenting selection criteria for identifying said plurality of versions of said selected object and for accepting a selection request in response thereto; said selecting means further comprising means for displaying said at least one of said plurality of versions.

17. A system for controlling versions of selected objects in an object oriented computing system on a computing platform, each object including an object frame containing data attributes and at least one object method for performing actions on the associated object, said version controlling system comprising:

means for creating a plurality of versions of a selected object, the data frame of each of said plurality of versions including a common logical key attribute, the data frame of each of said plurality of versions including a unique combination of an insert sequence attribute and an extract sequence attribute;

means, responsive to a selection request, for identifying said plurality of versions of said selected object based upon the common logical key attribute associated therewith; and means, responsive to a selection sequence value, for selecting at least one of said plurality of versions of said selected object by comparing said selection sequence value to at least one of said insert sequence attributes and said extract sequence attributes.

18. The version control system of claim 17 wherein the data frame of each of said plurality of versions further includes a perspective attribute, and wherein said selecting means is further responsive to a perspective value for selecting at least one of said plurality of versions of said selected object by comparing said selection sequence value to said insert sequence attributes and said extract sequence attributes and by comparing said perspective value to said perspective attribute.

19. A method for controlling versions of selected objects in an object oriented computing system on a computing platform, each object including an object frame containing data attributes and at least one object method for performing actions on the associated object, said version controlling method comprising the steps of:

creating a plurality of versions of a selected object, the data frame of each of said plurality of versions including a common logical key attribute, the data frame of each of said plurality of versions including a unique combination of an insert sequence attribute and an extract sequence attribute;

identifying said plurality of versions of said selected object based upon the common logical key attribute associated therewith, in response to a selection request; and selecting at least one of said plurality of versions of said selected object by comparing a selection sequence value to at least one of said insert sequence attributes and said extract sequence attributes.

20. The version control method of claim 19 wherein said selecting step comprises the step of identifying one of said versions of said selected object having an insert sequence attribute which is less than or equal to said selection sequence value, and an extract sequence attribute which is greater than said selection sequence value.

21. The version control method of claim 20 wherein said selecting step further comprises the step of identifying one of said versions of said selected object having an insert sequence attribute which is equal to said selection sequence value.

22. The version control method of claim 21 wherein said selecting step further comprises the step of identifying one of said versions of said selected object having an extract sequence attribute which is equal to said selection sequence value.

23. The version control method of claim 22 wherein said selecting step further comprises the step of identifying at least one of said versions of said selected object having an insert sequence attribute which is less than or equal to said selection sequence value, and an extract sequence attribute which is greater than or equal to said selection sequence value.

24. The version control method of claim 23 wherein said selecting step further comprises the step of identifying one of said versions of said selected object having an extract sequence attribute which is greater than said selection sequence value.

25. The version control method of claim 19 wherein the data frame of each of said plurality of versions further includes a perspective attribute, and wherein said selecting step is further responsive to a perspective value for selecting at least one of said plurality of versions of said selected object by comparing said selection sequence value to said insert sequence attributes and said extract sequence attributes and by comparing said perspective value to said perspective attribute.

26. The version control method of claim 19 wherein said creating step comprises the step of adding a new version to said plurality of versions.

27. The version control method of claim 26 wherein said creating step further comprises the step of changing at least one data attribute of at least one of said plurality of versions.

28. The version control method of claim 27 wherein said creating step further comprises the step of deleting at least one of said plurality of versions.

* * * * *

UNITED STATES PATENT AND TRADEMARK OFFICE
CERTIFICATE OF CORRECTION

PATENT NO.  :     5,499,365                         Page 1 of 3
DATED       :     March 12, 1996
INVENTOR(S) :     Anderson, et al.

It is certified that error appears in the above-identified patent and that said Letters Patent is hereby corrected as shown below:

On the cover page, Insert Titles of References omitted -
-- Rao, et al., "Dynamo:, A Model for a Distributed Multi-Media Information Processing Environment", *Proceedings of The Twenty Second Annual Hawaii International Conference on System Sciences*, 3-6 Jan. 1989, Kailua-Kona, Hi. pp. 800-809.

Hardwick et al., "The Rose Data Manager: Using Object Technology to Support Interactive Engineering Applications, IEEE *Transactions on Knowledge and Data Engineering*, Vol. 1, No. 2, June, 1989, pp. 285-289.

Kitagawa et al., "Design Data Modeling With Versioned Conceptual Configuration", *Proceedings of the 13th International Computer Software and Applications Conference*, 20-22 Sept. 89, Orlando, Fla. pp. 225-233.

Joseph, J.V. et al., "Object-Oriented Databases: Design and Implementation", *Proceedings of The IEEE*, Vol. 79, No. 1, January, 1991, pp. 42-64.

Chung, M.J. et al., "An Object-Oriented VHDL Design Environment", *27th ACM/IEEE Design Automation Conference*, 24-28 June 1990, Orlando, Florida, pp. 431-436.

Agrawal, R. et al., "Object Versioning in Ode", *Proceedings, Seventh International Conference on Data Engineering*, 8-12 April 1991, Kobe, Japan, pp. 446-455.

Wuu, G.T.J. et al., "A Uniform Model for Temporal Object-Oriented Databases", *Eighth International Conference on Data Engineering*, 2-3 February 1992, Tempe, Arizona, pp. 584-593.--

UNITED STATES PATENT AND TRADEMARK OFFICE
CERTIFICATE OF CORRECTION

PATENT NO. : 5,499,365

DATED : March 12, 1996

INVENTOR(S) : Anderson, et al.

It is certified that error appears in the above-identified patent and that said Letters Patent is hereby corrected as shown below:

On the cover page, Insert Titles of References omitted -

--Tzi-Cker Chiueh et al., "Intelligent Vlsi Design Object Management" *Proceedings, The European Conference On Design Automation*, 16-19 March 1992, Brussels, Belgium, pp. 410-414.

Xiaoying Liu et al., Transaction Management For Object-Databases: Performance Advantages of Using Multiple Versions", *Proceedings, 25th Annual Simulation Symposium*, 6-9 April 1992, Orlando, Fla. pp. 222-231.

Jaccheri, L. et al., "Software Process Modeling and Evolution in EPOS," *Proceedings, Fourth International Conference on Software Engineering and Knowledge Engineering*, 15-20 June 1992, Capri, Italy, pp. 574-581.--

Column 2, line 65, after "sequence" delete the period ".".

Column 4, line 44, after "system" insert --28--.

Column 4, line 50, after "environment" insert --11--.

Column 6 line 59, after "reference" insert a period --.--.

UNITED STATES PATENT AND TRADEMARK OFFICE
CERTIFICATE OF CORRECTION

PATENT NO. : 5,499,365  
DATED : March 12, 1996  
INVENTOR(S) : Anderson, et al.

Page 3 of 3

It is certified that error appears in the above-identified patent and that said Letters Patent is hereby corrected as shown below:

Column 10, lines 8-9, close up space (no indent).

Column 10, line 62, before "Object" insert --c--.

Column 10, lines 62-65, close space (same paragraph).

Column 11, lines 45-46, close up space (no indent).

Column 12, lines 14-15, this is sub-heading (space needed).

Column 12, line 22 delete "i" and insert --_i"--

Column 14, line 35, delete "masters list:" and insert --masters_list:-- therefor.

Column 15, line 7, "20" should not be in bold type.

Column 16, line 58, after "of" delete the dash (__).

Signed and Sealed this

Third Day of March, 1998

*Attest:*

BRUCE LEHMAN

*Attesting Officer*  *Commissioner of Patents and Trademarks*